(12) United States Patent
Bertazzo Teruel (10) Patent No.: US 8,580,067 B2
(45) Date of Patent: Nov. 12, 2013

(54) THERMO-SEALING CONTROL METHOD AND PACKAGING FOR RESEALABLE PACKAGING

(75) Inventor: Nelson Luis Bertazzo Teruel, Miami, FL (US)

(73) Assignee: Chroma Paper, LLC., Miami, FL (US)

( * ) Notice: Subject to any disclaimer, the term of this patent is extended or adjusted under 35 U.S.C. 154(b) by 36 days.

(21) Appl. No.: 13/403,000

(22) Filed: Feb. 23, 2012

(65) Prior Publication Data

US 2013/0224409 A1 Aug. 29, 2013

(51) Int. Cl.
*B29C 65/02* (2006.01)
*B29C 65/48* (2006.01)
*B32B 37/14* (2006.01)
*B32B 38/10* (2006.01)
*B32B 38/14* (2006.01)
*C08J 5/18* (2006.01)
*C09J 5/02* (2006.01)

(52) U.S. Cl.
USPC ...... 156/247; 156/277; 156/308.4; 156/308.8

(58) Field of Classification Search
USPC ............... 156/73.4, 73.5, 155, 182, 247, 277, 156/283, 289, 305, 307.1, 307.3, 307.7, 156/308.2, 308.4, 308.6, 308.8; 427/7, 427/207.1, 208.2, 208.6, 208.8, 258; 53/384.1, 396, 412; 264/173.19; 428/40.1, 42.1, 346, 347, 352, 355 R, 428/500
See application file for complete search history.

(56) References Cited

U.S. PATENT DOCUMENTS

| | | | |
|---|---|---|---|
| 3,258,386 A | 6/1966 | Blythe | 156/583.4 |
| 3,454,210 A | 7/1969 | Spiegel | 229/123.1 |
| 3,947,165 A * | 3/1976 | Szatkowski | 425/3 |
| 3,968,280 A * | 7/1976 | Poppe et al. | 215/12.2 |
| 4,035,528 A * | 7/1977 | Poppe et al. | 427/195 |
| 4,266,339 A * | 5/1981 | Kalt | 29/829 |
| 4,423,823 A * | 1/1984 | Franek et al. | 220/614 |
| 4,506,914 A * | 3/1985 | Gobeli | 283/70 |
| 4,704,297 A * | 11/1987 | Binns et al. | 427/9 |
| 4,988,547 A * | 1/1991 | Voto et al. | 428/35.2 |
| 5,089,320 A | 2/1992 | Straus | 428/216 |
| 5,382,472 A | 1/1995 | Yanidis | 428/349 |
| 5,412,924 A * | 5/1995 | Ausnit | 53/412 |
| 5,460,269 A * | 10/1995 | Bayer | 206/497 |
| 5,534,356 A * | 7/1996 | Mahulikar et al. | 428/615 |
| 5,756,567 A * | 5/1998 | Rohrmann | 524/232 |
| 5,830,547 A * | 11/1998 | MacKenzie et al. | 428/36.1 |
| 5,878,549 A | 3/1999 | Littmann | 53/412 |
| 5,882,749 A | 3/1999 | Jones | 428/35.2 |
| 5,956,877 A * | 9/1999 | Raasch et al. | 40/702 |

(Continued)

*Primary Examiner* — Sing P Chan
(74) *Attorney, Agent, or Firm* — Jesus Sanchelima; Christian J. Sanchelima (57) ABSTRACT

A packaging and method for controlling the seal strength between two cooperating thermo-sealable films at predetermined sealing portions, where a predetermined amount of heat is applied over a predetermined period of time. The resulting packaging is resealable after the first separation of two surfaces. The strength of the seal controlled by defining the number and dimensions of a plurality of restricted areas without a material cover that is resistant to the thermo-seal effect. The restricted area can be defined with a plurality of dots of predetermined selected shapes and dimensions. The resulting article facilitates the rupture of the packaging along a predetermined path. With this process, a fixed predetermined heat and residency time can be chosen and the seal strength can still be varied in different areas of a packaging. Non-sealable microdots with a predetermined amount of adhesive deposits also covered by a polypropylene powder deposit permit its resealing.

8 Claims, 5 Drawing Sheets

(56) References Cited

U.S. PATENT DOCUMENTS

| | | | |
|---|---|---|---|
| 5,957,974 A * | 9/1999 | Thompson et al. | 623/1.13 |
| 6,155,423 A * | 12/2000 | Katzner et al. | 206/531 |
| 6,214,766 B1 | 4/2001 | Kurrle | 503/201 |
| 6,818,276 B2 * | 11/2004 | Bourdelais et al. | 428/141 |
| 7,118,792 B2 * | 10/2006 | Hewitt et al. | 428/100 |
| 8,056,716 B2 * | 11/2011 | Fonteyne et al. | 206/365 |
| 8,418,648 B2 * | 4/2013 | Maly et al. | 118/621 |
| 2004/0009422 A1 * | 1/2004 | Reynolds | 430/124 |
| 2004/0048081 A1 * | 3/2004 | Hewitt et al. | 428/500 |
| 2007/0009599 A1 * | 1/2007 | Kim | 424/472 |
| 2009/0081405 A1 | 3/2009 | Singh | 428/76 |
| 2010/0028553 A1 * | 2/2010 | Maly et al. | 427/462 |
| 2010/0314278 A1 * | 12/2010 | Fonteyne et al. | 206/469 |
| 2012/0261020 A1 * | 10/2012 | Cavalie | 138/141 |
| 2013/0008332 A1 * | 1/2013 | Nair et al. | 101/483 |

* cited by examiner

THERMO-SEALING CONTROL METHOD AND PACKAGING FOR RESEALABLE PACKAGING

BACKGROUND OF THE INVENTION

1. Field of the Invention

The present invention relates to innovative packaging and thermo-sealing control method in packaging production and the resulting article of manufacture that uses thermo-sealing plastic films to solve problems in sealing strength and providing resealable features.

2. Description of the Related Art

Several approaches to provide sealed packages formed from a polymer film with heat sealable portions have been designed in the past. In the thermo-sealing arts, controlling the amount of heat to accurately achieve a predetermined sealing is difficult. The present invention addresses this problem by providing an accurate method for controlling sealing strength that is compatible with high speed production technology. With a constant heating temperature and residence time, the present invention still permits obtaining different sealing strengths for different areas in a packaging by varying the characteristics of the restricted areas or microdots. Additionally, the resulting packaging permits a user to reseal the packaging after initially breaking it. These novel features, while desired for a long time, have not been provided by the designs currently existing in the state of the art.

One of these designs is described in US patent publication No. US 2009/0081405 (Shalendra Singh) published on Mar. 26, 2009. Singh bases his sealing control on special polymer films in which the sealing features are reduced by the combination of its resins. While this publication discloses the general use of sealing control through the special polymer films, it does not disclose the use of restricted areas or microdots in the region of film overlay to selectively reduce (weaken) the resulting seal in those areas nor does it even suggest a packaging that is resealable.

Another related reference corresponds to U.S. Pat. No. 3,258,386 issued to Blythe in 1966 for a thermosealing device. This patent discloses a mechanism that utilizes a heat diffuser or generator to seal specific points. The Blythe patent not only discloses a costly device that is also costly to use, but it teaches away from the invention. Blythe acknowledges the existence of the problems in the industry. See Col. 1, lines 33-63. Blythe teaches the use of special heated pyramidal tools (straight or rolls) on the film. These tools have the valleys of its composition filled with non-heat conductive material so as not to harm the polymer film when pressed against it. The grinding also needs to produce a smooth surface. The present invention is practically the reverse through the application of a covering with low thermal conductivity to define a predetermined number of controllable microdots that in turn result in sealing areas of predetermined sealing strengths. Also, the thermal contact needs to be maintained exactly in the same place until sealing is complete. This is incompatible with modern high speed rotating equipment, like the Will Pemco's Ream Wrapper 39S since the ream slides against different heated plates in its final compression not making possible to keep the same sealed points as generated by the initial tool. Pemco, Inc. is located at 3333 Crocker Avenue, Sheboygan, Wis. Blythe requires a complicated mechanism for controlling the sealing of the packaging at predetermined areas. Lastly, this patent does not disclose any resealable characteristics of the packaging.

In the patent issued to Frederich L. Kurrle on Apr. 10, 2001 and entitled "Security Feature for Paper Products" under U.S. Pat. No. 6,214,766 (2001), the patentee discloses the use of microdots for security purposes as protection against counterfeiters. Col. 3, lines 20-34. However, there is no teaching or suggestion of the use of microdots for controlling the strength of a sealing portion in a packaging. Also, this patent does not disclose the resealing feature (re-opening and re-closing the package after it is opened the first time).

Another related reference is U.S. Pat. No. 5,878,549 issued to Richard Littman in 1999 entitled "Packages with Controlled Easy-Open Features" that utilizes roughened portions of the outer and inner surface of the films. In addition to requiring the matching of the two surfaces, this approach robs otherwise available space for advertisement. The selective use of microdots in the present invention is more effective and compatible with production requirements.

Usually the problem with the sealing of packages is that there is not sufficient control over the sealing feature of a plastic film, which makes the industrial process more difficult to control temperature, pressure and thermo-sealing time. These difficult parameters of time, pressure and temperature are recorded as irregular and the packing machine during producing has inconsistent sealing throughout the process result in some packaging having too strong sealing and others opening too easily.

The thermally sealed packaging products produced today present several sealing problems as discussed below. When the sealing is too strong, the packaging is difficult to open, it irritates the customer, and worse it risks tearing the packaging at the moment of opening since it requires more strength for the task. In that case, the product can be exposed to contamination since it can easily fall off the packaging. Another problem caused by excessively strong sealing is the risk of possible damage to hands and fingernails of customers due to the use of too much physical strength or cutting objects.

When the packaging sealing is weak, it causes high rate of loss in the product distribution chain due to package opening before reaching the end customer, increasing investments in logistics and restocking, not to mention damage to products and the manufacturer's image in the customers' minds.

Usually, manufacturers try to offset these difficulties in sealing control by using noble plastic films with low fusion temperature, making wrapping more expensive without totally solving the problem of inconsistent sealing strength during the packing process and its effects.

Usually, this type of packaging can also show FC (friction coefficient) problems between the wrapping and the metallic parts of the packing machine, which can slow the process and productivity.

With respect to the ability to reseal the packaging, several mechanisms have been designed in the past that are difficult to adapt to production line requirements, adding to production costs. One of these attempts is in the patent issued to Jones et al on Mar. 16, 1999 entitled "Easy Opening Reclosable Package" under U.S. Pat. No. 5,882,749. This patent describes the manufacture of thermo-sealable packaging films with the addition of complex adhesive tapes, which have outside sealable sides through two compatible and sealable films along the substrate of the main packaging and in its center the application of tacky adhesives. In this process the package opens with the disruption or division of the sealing power of the sticky patch at the time of product use and can later be re-closed at the same place. The process of this patent becomes complex and expensive at the moment it requires the application of an external element to the film package: the adhesive tape, which has limitations in machinery installation and adjustment when changing formats and layouts of new packages. The process taught by Jones et al does not presents a possibility of resealing the package by use of the film from the package only and requires multiple processes to build and apply the tape at, at least, two films and multiple layers of adhesive and release controls in the adequate place of the package.

U.S. Pat. No. 3,454,210 discloses packages made from a base web with a pressure sensitive adhesive layer across it, and connected to a base film to form the package. The package is opened by breaking the tearable film and removing it from the layer of pressure sensitive adhesive. This leaves a surface of pressure sensitive adhesive exposed and against which the web can be pressed to seal the package. The main disadvantage of packages disclosed in this patent is that the whole web on the package carries a layer of pressure sensitive adhesive. Since the pressure sensitive adhesive is only required where the opening should be made, special arrangements need to be undertaken for the web in production. These are expensive materials, therefore, this approach is costly and too expensive.

U.S. Pat. No. 5,089,320 discloses a similar flexible packaging material which is heat sealable to itself. The packaging material has a sticky adhesive layer sandwiched between a surface layer of a heat sealable polymer and a substrate. The sticky adhesive is distributed throughout the material. The patent also reveals that since the adhesive is tacky only required where the opening should be made, the adhesive may be applied on the substrate to register it, only where needed. The skin layer can also be applied to the record of the adhesive itself, as of the printing of the adhesive layer and skin layer on the substrate subsequentially using a center printing press. The skin layer can be applied to the surface of the other areas of the substrate too, up to the entire surface of the packaging material. The patent also discloses that the sticky adhesive may be applied to the substrate through means of transport transfer, which uses another film as transportation, which usually has a feature release or absence of corona treatment. This process is known in the processes of metallization transfer, and presents a great economic disadvantage of requiring the use of a productive process with the use of endless belts or other substrates such as film transport, where disposal and loss of transportation film or liner sometimes occurs. In conclusion, the approach disclosed in this patent to distribute the tacky adhesive over the packaging material is disadvantageous for the reasons explained previously and sticky adhesive coating only where needed using skin film or by transfer by releasefilm or liner is also disadvantageous because of the need to the complete one more productive process with the use of endless belts or other substrates such as film transport, where disposal and loss of transportation film or liner sometimes occurs.

U.S. Pat. No. 5,382,472 discloses a re-sealable packaging material made by side-by-side simultaneous coextrusion of several thermoplastic resins through a dye to form a film with two or more bands of material that extend in the machine direction. The first band contains conventional packaging polymers and no pressure sensitive adhesive, and the second band includes a surface layer of heat sealable polymer, a core layer of pressure sensitive adhesive and a layer of thermoplastic resin adjacent the layer. In the disclosed side-by-side coextruded film the bands are alongside one another and the second band has the same thickness as the first. The surfaces of the second band are shown as being co-planar with the surfaces of the first band. Each band extends from one surface of the side-by-side coextruded film to the other surface of the film. The film is folded upon itself and heat sealed to form a package by sealing jaws acting in heat sealable polymer in the second band. When the heat seal is pulled apart, the heat seal layer ruptures through to the pressure sensitive adhesive and delaminates from it. The rupturing and delamination occur within the boundaries of the side-by-side coextruded film. The approach disclosed in this patent is disadvantageous in several respects. It is limited in that coextruded films can only be made by side by side coextrusion. Side by side coextrusion in turn is limited in that side by side dyes are designed to run with only some resins. Even if it is designed to run a variety of resins, each dye is set to place the second band in a fixed location. To change the location of the second band, a new dye is required. Making adjustments within a given dye to meet one or more resins is problematic and may result in superficial non-uniformity of thickness of the first and second bands. Even a small difference in thickness of the second band will result in a raised area or hollow area along one side of the surface of a roll of the side-by-side coextruded film. To minimize surface non-uniformity on a roll, roll size for shipments to customers will be kept relatively small. This will cause more frequent roll changes than desired. Another approach which employs a tacky adhesive to provide an opening feature for a flexible package is that wherein an elongated cut is made through a packaging film. The cut is widened and a reclose tape wider than the cut and made of a substrate layer and a tacky adhesive layer is fed by a carrier system and applied with the tacky adhesive side down to the film to cover the open cut. The film is folded over on itself and pressed together without heat to adhere the tacky adhesive through the open cut to the opposite wall of the film. To open the package, the tape's tacky adhesive is pulled away from the opposite wall of the package. This approach is disadvantageous because it requires that the tape's tacky adhesive layer be treated or covered with a removable release layer, or carried on a silicone coated paper carrier layer. These treatment systems and removable cover or carrier systems add steps, equipment and expense to produce the tape and package.

The published Japanese patent application No. 10-101130 of Apr. 21, 1998 entitled Packaging Structure with OVERWRAP FILM shows a packing material for objects such as disk or tape cassette tapes. This packing thermo-selable material known in the market receives printed advertising in the weld area, which reduces and disrupts the weld quality of the films, creating an appropriate zone for the easy opening of the package. However this primary technique of seal strength reduction through contamination of ink among the resins does not establish control thermo-selability control, does not control the strength of fusion on the weld, does not teach about FC control by the addition of additives to packaging paints and varnishes and neither has any solution to the possibility of re-closing the package and protecting its contents during their partial use.

Based on the above-related disclosures, the present invention is simpler, requiring no additional steps, processes, or substrates, thus making it possible to create desired effects, such as simple opening and easy re-closing and re-opening for an indefinite number of times, at the time of printing the packaging.

Other documents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a method for controlling the strength of a seal in thermo-sealed packaging that is capable of being resealed after being initially broken.

It is another object of this invention to provide such a method that includes the selective allocation of restricted areas for the creation of microdots.

It is still another object of the present invention to provide such a method where the restricted areas include ink compositions capable of producing graphical representations.

It is yet another object of this invention to provide such an article of manufacture that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The present invention relates to a method for controlling the sealing strength between two cooperating film portions using thermo-sealing technology. The first step of the method is to determine the sealing portions of two cooperating films. The second step is an application of a non-sealing composition over predetermined restricted areas. These restricted areas can be defined by discrete repetitive designs that, in combination, define the restricted areas.

In some cases, it is needed to have the restricted area designs applied on both sides of the film's sealing portion (front and back), in the predetermined areas that will receive the heat for sealing. The method in the present invention enhances the quality of the resulting packaging with a more controlled sealed closure at selected areas.

The applicant has developed a more effective technique to control the thermo-sealing during packaging production that uses thermo-sealing plastic films, known to the market, and solves the old problem of having packaging seals that are too strong for a user to readily open it when needed. Additionally, the packaging, subject of the present invention, has adhesive deposits that are available to be used for resealing the films' portions after rupturing it the first time.

Figure 5:
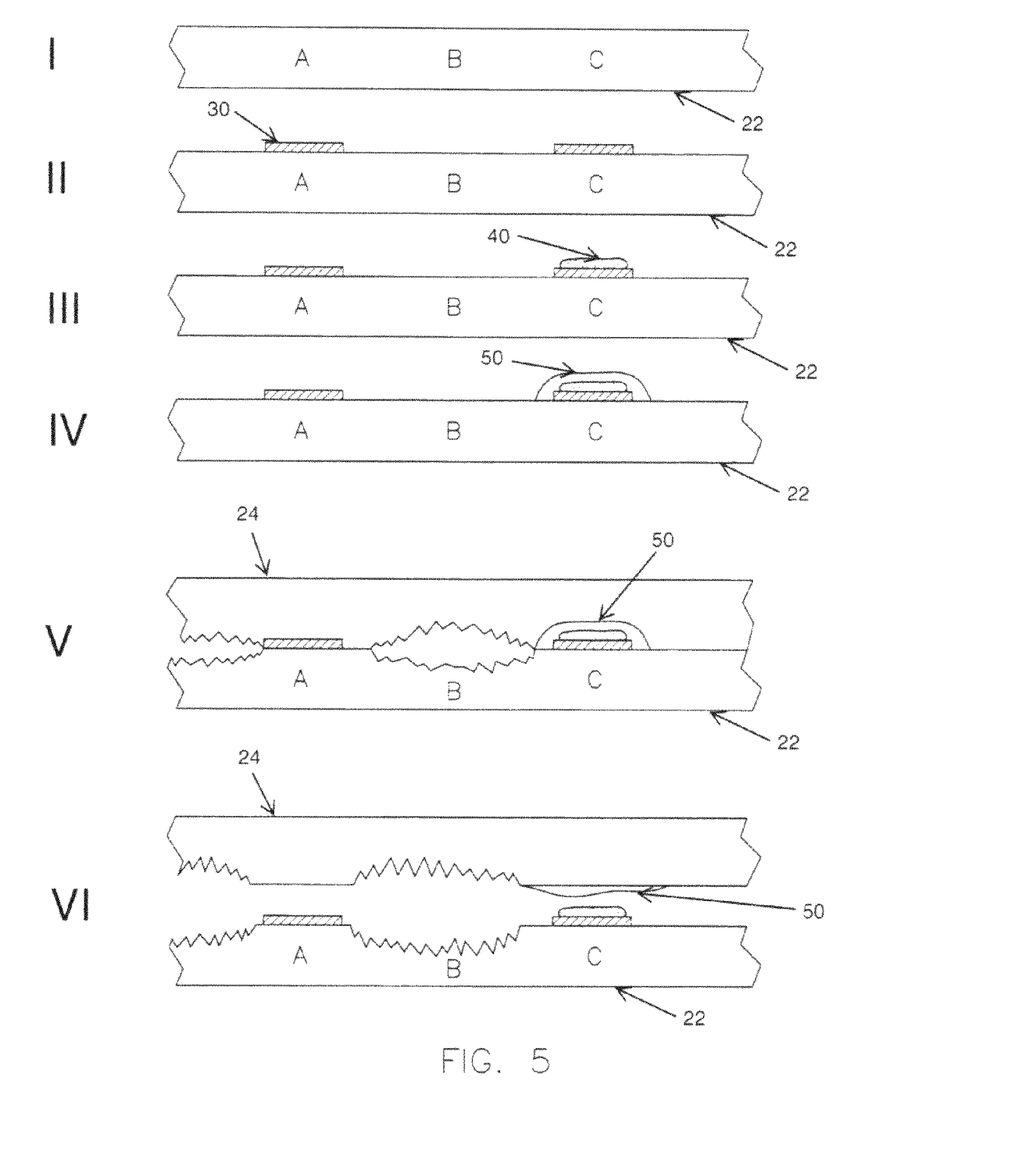
FIG. 5 represents the different steps (I through V) followed for manufacturing the resealable packaging subject to the preset invention. Step VI shows the films after separation.

The method invented by the applicant works through restricting or reducing the sealable area of film contact, in overlapping areas of the film through the application of non-sealable inks and varnishes around the restricted areas. The material can be applied with flexographic, rotogravure, offset and/or digital printing technologies. The presence of these restricted areas, in a balanced way, permits a use to control the strength of the packaging sealing, giving this packaging an easy open feature yet also being sufficiently sealed. A predetermined amount of an adhesive 40 is deposited on some of the microdots or non-sealable areas 30. Subsequently, those non-sealable areas 30 where adhesive 40 has been deposited are covered by applying an electrostatic deposit of polypropylene powder (PP). The different process steps are shown in FIG. 5, sequence steps I through V. The adhesive (which acts like a tack) can be deposited using a rotogravure process or a device for applying hot-melt adhesives on a predetermined member of non-sealable areas 30.

The sealing control method in packaging covers by printing with non-sealable inks and varnishes defining microdots 30 and predetermined restricted sealable areas 20 in film 22 that are applied over a thermo-sealing film 22 in the overlapping areas. The overall sealing strength of a portion of the packaging is controlled, allowing simple and easy opening without the significant tearing of the package or causing damage to hands and fingernails while maintaining a sufficient seal. As shown in step VI, FIG. 5, when the two films are separated, the PP deposit 50 separates from adhesive 40. This permits a user to reseal the package by applying pressure of a predetermined magnitude causing adhesive 40 to adhere to PP deposit 50. PP deposit 50 is fused with film 24 in step V.

Figure 4:
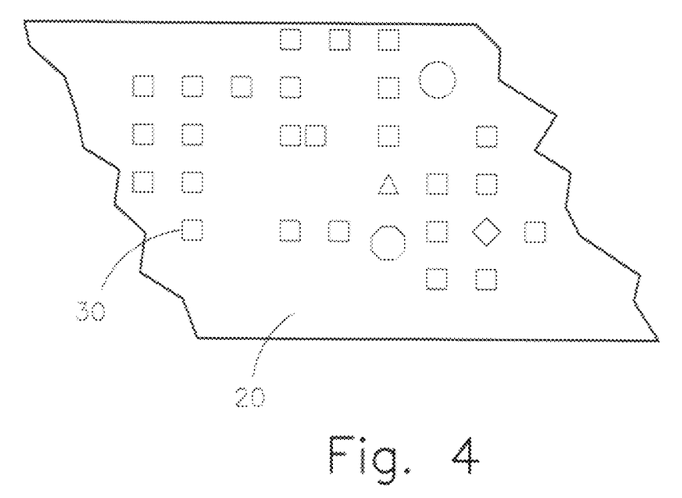
FIG. 4 is an enlarged view of a sealable portion including different microdot designs 30 with printing ink or varnish material.

The method can be implemented by applying (printing) in the thermo-sealing areas around restricted areas or microdots that can have several designs, such as circular, square, rectangular, oval, triangular or polygonal forms with three or more sides, regular or irregular, in different sizes and in different quantities and/or distribution, according to the needed strength of the thermo-seal, as can be best seen in FIG. 4. The printing will be adapted to, and/or reconcile with, the graphic project of the advertisements printed on the packaging.

Another advantage this new method in contrast to other approaches for sealing control is that the manufacturer using this method will be able to control or enhance the film's friction coefficient (FC) during the packaging process. To this end a user can utilize non-sealable varnishes with additives to control the friction coefficient, which will increase productivity in the packaging production line.

Figure 1:
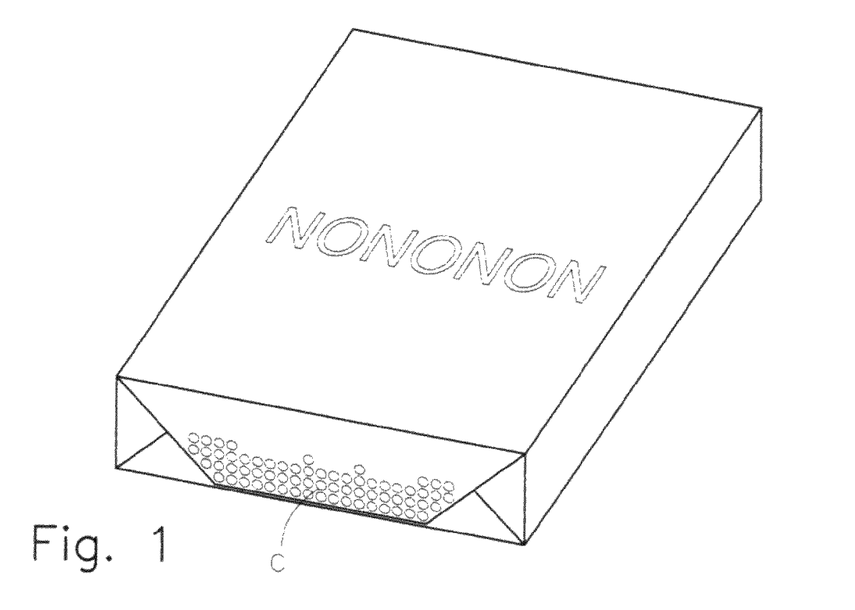
FIG. 1 is an isometric representation of a packaging for a ream of sheets of paper with a plurality of sealable areas devoid of any ink or varnish material and microdots or non-sealable areas, pursuant to the present invention.
Figure 1A:
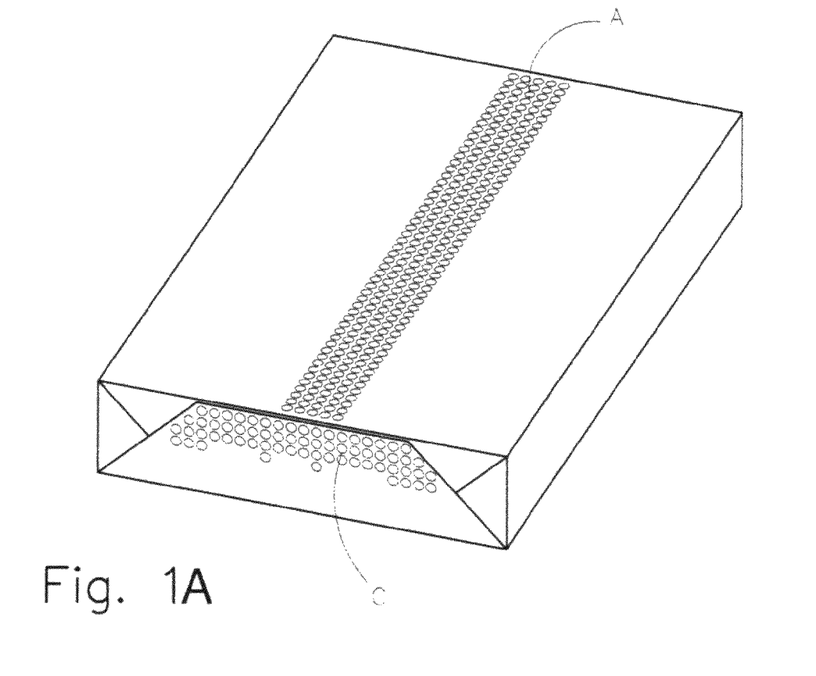
FIG. 1A shows the underside of the packaging shown in the previous figure.
Figure 2:
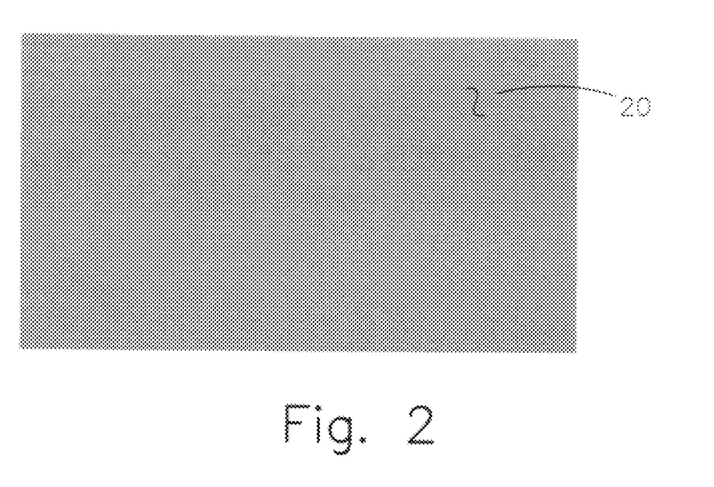
FIG. 2 is a representation of a cross-sectional view of a film used in the packaging of the previous figure without ink or varnish.
Figure 3:
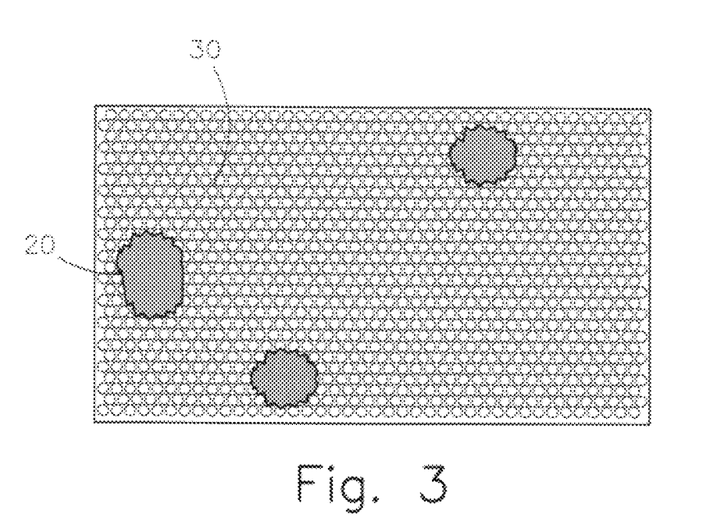
FIG. 3 is a representation of the cross-sectional view of the film in the previous figure with a coat of material applied thereon and a representation of several restricted areas or microdots 30 without the material.

One of the possible examples for using the present method and resulting packaging is illustrated in the drawings. FIGS. 1 and 1A show a packaging for a ream of sheets of paper. Areas A and C are indicated where different sealing strengths can be used by varying the area and shape of the microdots. FIGS. 2 and 3 represent sections of the packaging without and with the microdots 30, respectively. In FIG. 4, restricted areas are represented, such as square design microdots 30. These areas include ink or varnish that prevent sealing in that area. Other shapes for the microdots 30 are represented. In FIG. 5, an enlarged partial representation of the packaging with microdots 30 is shown. FIG. 5 also shows two overlapped films that will be subjected to heat, and between them are the inks or varnishes with microdots 30 that restrict surrounding sealable area 20.

Figure 6:
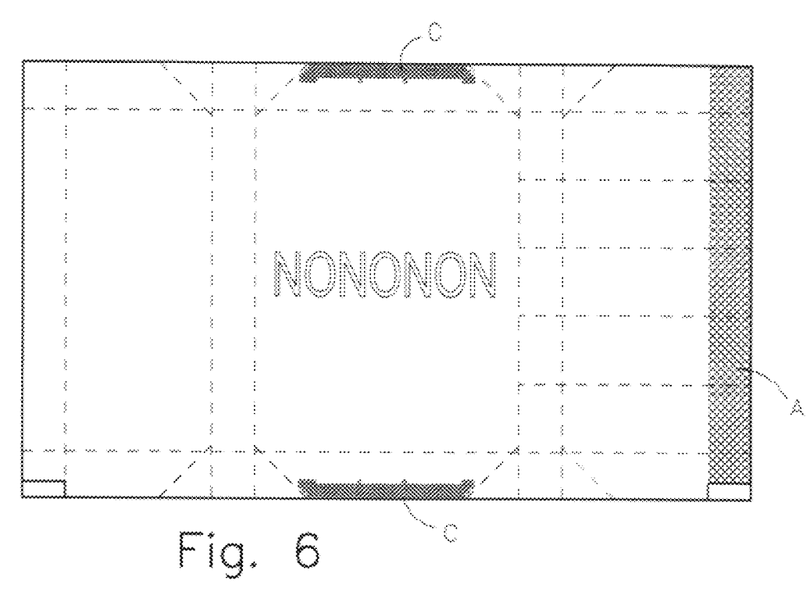
FIG. 6 is a top view of a packaging film with a plurality of restricted areas or microdots at upper and lower ends with an area with a higher density of the microdots to the right.
Figure 7:
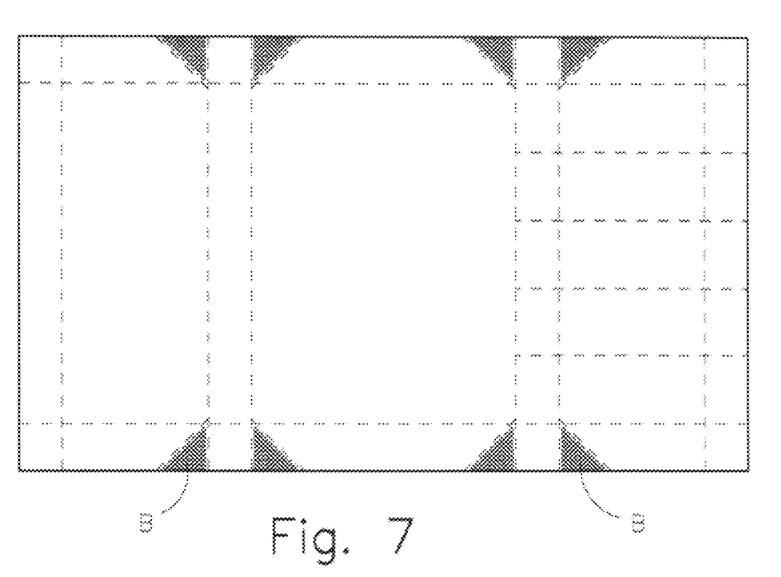
FIG. 7 shows the opposite side of the one represented in the previous figure with groups of restricted areas or microdots with relatively high density thus controlling the seal in the folding areas of the packaging.

In FIGS. 6 and 7, the flattened package is represented with areas A, B, and C indicated. The manufacturer selects the strength of the seal depending on the manner that it expects the end user to open the packaging.

This new technique of thermo-sealing control can be used in different kinds of films 22; 24 compatible for sealing among them. They can be used as a monolayer, laminated among them or laminated to other material. Polyethylene of one or more layers, polypropylene of one or more layers, and polypropylene bi-axially oriented (BOPP) of one or more layers can also be used. The thickness of the films mentioned above can be from 10 mc (0.40 mil) to 300 mc (12 mil).

One of the features of the new technique is that it can control the sealing feature of the packaging without increasing production costs significantly using the advertising area for printing (non sealable) as controlling tool in the process. They also make the packaging more thermal resistant and anti-abrasive which is important to the printed packaging.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A process for controlling the seal strength between two cooperating thermo-sealable films comprising the steps of:
    A) providing two thermosealable films with at least one sealing portion;
    B) apply a material having thermal insulation characteristics to a predetermined plurality of non-sealable areas to provide a controlled predetermined thermal seal strength and a path having less resistance to disengagement of the seal between said films;
    C) depositing an effective amount of an adhesive on a predetermined number of said non-sealable areas;
    D) electrostatically depositing polypropylene powder over said non-sealable areas where said adhesive was deposited; and
    E) applying a predetermined amount of heat to said sealing portions over a predetermined time period to achieve an effective seal where there are no non-sealable areas on said surfaces.

2. The process set forth in claim 1 wherein said non-sealable areas are defined by dots having predetermined shapes and dimensions.

3. The process set forth in claim 2 wherein the shape of said dots is circular.

4. The process set forth in claim 2 wherein the shape of said dots is varied to achieve a predetermined seal strength.

5. The process set forth in claim 2 wherein the dimensions of said dots are varied to achieve a predetermined seal strength.

6. The process set forth in claim 2 wherein the density of said dots is varied to achieve a predetermined seal strength.

7. The process set forth in claim 2 wherein the friction coefficient of said material falls within a predetermined range that is compatible with high-speed production methods for packaging products.

8. The process set forth in claim 1 wherein said step of depositing said effective amount of said adhesive on said predetermined number of non-sealable areas utilizes a rotogravure process.

\* \* \* \* \*